United States Patent [19]

King

[11] B 3,985,491

[45] Oct. 12, 1976

[54] HOT STAMPING DIE CHASE

[75] Inventor: Harold W. King, Kansas City, Mo.

[73] Assignee: Ethyl Development Corporation, Kansas City, Mo.

[22] Filed: Mar. 28, 1975

[21] Appl. No.: 562,813

[44] Published under the second Trial Voluntary Protest Program on February 3, 1976 as document No. B 562,813.

[52] U.S. Cl. .................................. 425/384; 425/385; 425/403; 425/394

[51] Int. Cl.[2] .......................................... B29C 17/00

[58] Field of Search ........... 425/384, 387, 388, 394, 425/398, 403, 385

[56] References Cited

UNITED STATES PATENTS

| | | | |
|---|---|---|---|
| 2,496,014 | 1/1950 | Myers | 425/384 X |
| 2,849,752 | 9/1958 | Leary | 425/384 X |
| 3,072,964 | 1/1963 | Tilden | 425/388 |
| 3,553,784 | 1/1971 | Shuman | 425/384 X |
| 3,593,376 | 7/1971 | Kisker et al. | 425/384 X |

*Primary Examiner*—J. Howard Flint, Jr.
*Attorney, Agent, or Firm*—Donald L. Johnson; John F. Sieberth; Edgar E. Spielman, Jr.

[57] ABSTRACT

A hot stamping die chase is disclosed. The die chase features a base onto which a die is attached. Surrounding the die is a support frame for supporting the article to be stamped as it passes over the die. The article support frame has openings therethrough through which the die protrudes.

10 Claims, 7 Drawing Figures

HOT STAMPING DIE CHASE

BACKGROUND OF THE INVENTION

Cylindrical articles, such as hollow, flexible wall, plastic bottles, have been decorated using hot stamping apparatuses for some time. One particularly useful apparatus is the one disclosed in U.S. Pat. No. 3,816,207. The article is decorated on this apparatus by mounting the article to the apparatus and pressurizing the article; moving the pressurized article so that it makes contact with a strip of decorating material and pressing the decorating material onto the article by means of a moving die. As the die presses on to the article, the article is rotated so that the decoration occurs around the periphery of the surface.

The dies utilized in peripheral hot stamping apparatuses are generally made by forming raised indicia or designs on a sheet of silicon rubber and attaching the sheet to a metal plate. The configuration of the raised design will determine the particular decoration to be imparted to the article. Generally the height of the design is about 0.040 inches. Despite general satisfaction with the utilization of such dies, there are some drawbacks. For example, edges of the designs, due to their height, become worn as they are worked repeatedly across the article surfaces. Therefore designs having a lower height would be desirable from this standpoint. However, utilization of lower heights is not practical with present dies as the extra height is needed to assure good formation of the decoration onto the article. Another problem realized when utilizing present day dies is that there is a relatively long heat recovery time required. When an article is brought across the die, heat from the die is absorbed by the article. Due to the height of the silicon rubber design, which material is a poor heat conductor, a long reheat time is required to get the designs back to the temperature desired. Still a further problem with present day dies is that the entire article surface is contacted with the total die resulting in the entire article surface being heated. Such a heating places a high heat requirement on the dieing apparatus and also causes distortion in the printing.

Therefore it is an object of this invention to provide a unique hot stamping die chase which will allow for the utilization of die which have high heat recovery and which are not subject to wearing of the corners.

THE INVENTION

This invention relates to a hot stamping die chase which is utilized in decorating hollow, plastic articles. The chase of this invention features a heat transfer base; a die carrying member for carrying the die, the die carrying member being joined to the base; and an article support member having a face for supporting the surface of the article as the article comes into contact with the die, the article support member having at least one opening therethrough through which the die protrudes above the face.

Preferably the die is made of raised designs on a sheet of silicon rubber. These designs are preferably from about 0.010 to about 0.025 inches high. Another preferred feature of the apparatus of this invention is an article support member having channels therein through which a cooling fluid may circulate. The fluid will be utilized to keep the article support member cool thereby saving the surface of the article, except that part which comes in contact with the die, from being heated.

As can be appreciated from the above, the die chase of the present invention will not suffer the before-discussed difficulties realized for present-day dies. The article support member will protect the corners of the designs from wear as they are worked across the article surface. Also, due to the relative short height of the silicon rubber designs, there will be a short heat recovery time between article printing. With the utilization of a cooled article support member it will no longer be necessary to heat the entire container, thus insuring a low heat demand made on the printing apparatus and the achievement of high fidelity in printing. Still another advantage found is when, in a preferred form, only from about 0.001 to about 0.006 of the design protrudes above the face of the article support member. The advantage realized is that there is less flexing of the design portion of the die as the article is worked over the design thus resulting in a sharp, well-defined decoration.

These and other features of the invention contributing satisfaction in use and economy in manufacture will be more fully understood from the following description of a preferred embodiment of the invention when taken in connection with the accompanying drawings, wherein identical numerals refer to identical parts and in which.

Referring now to FIGS. 1–6, it can be seen that a hot stamping die chase of this invention, generally designated by the numeral 10, has heat transfer base 50, dies 24 and **24*a*, and article support member 12**.

Figure 4:
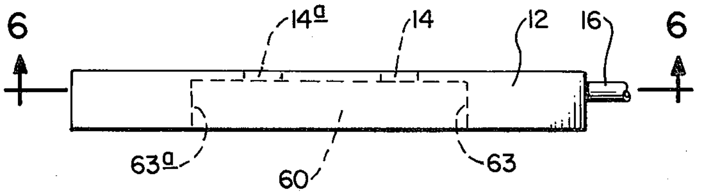
FIG. 4 is a side elevational view of the article support member shown in FIG. 3.
Figure 5:
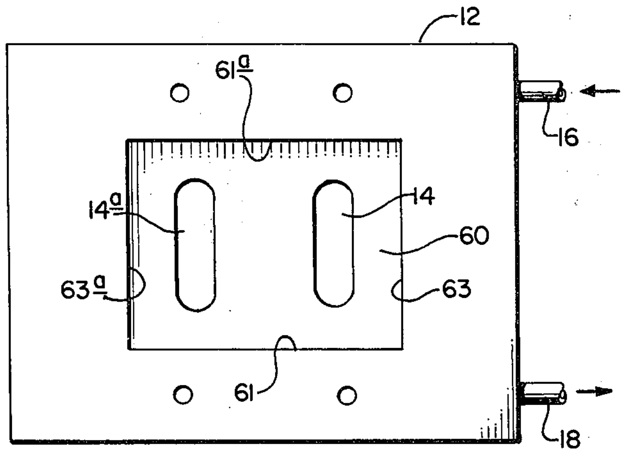
FIG. 5 is a bottom view of the article support member shown in FIG. 4.
Figure 6:
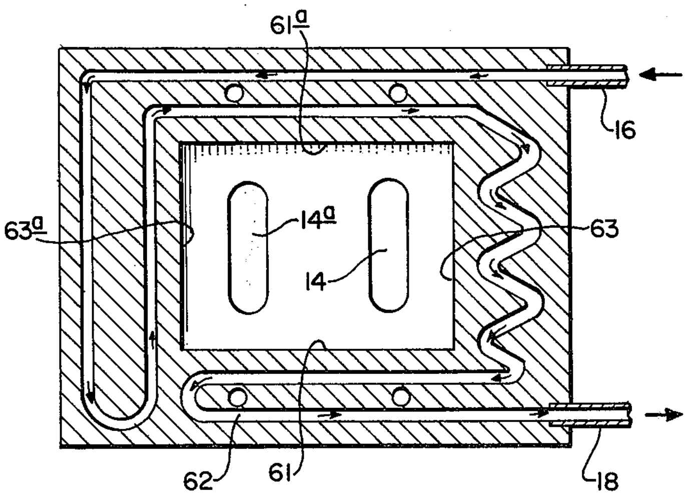
FIG. 6 is a sectional view taken along section lines 6—6 of FIG. 4.

Article support member 12 has openings 14 and **14*a* cut therethrough. As can also be seen from the drawings, article support member 12 is rectangular in shape, and has a face 11 which is planar and smooth. Curved or rough surfaces may be used without departing from the principle of this invention. The rectangular shape of article support member 12 is most adaptable to modern-day hot stamping apparatuses. Other shapes may, of course, be used as the need arises. As can be seen in FIGS. 4–6, article support member 12 has a generally rectangular recess 60 cut in the underside thereof. Recess 60 is dimensioned so as to fit over pedestal carrier 30 and spacer plate 32, hereinafter described. Not only dies recess 60 fit over pedestal carrier 30 and spacer plate 32 but it is also dimensioned so that there is no contact between recess walls 61, 61*a*, 63 and 63*a*. By not having this contact, a small insulating layer of air will be provided thus retarding any heat flow from pedestal carrier 30 and spacer plate 32 to article support 12. To aid in keeping article support member 12 at a temperature lower than that of dies 14 and 14*a*, is channel 62 in the interior of article support member 12 through which cooling fluid may be passed. Entrance of cooling fluid is through entrance port 16 and exit of this fluid is through exhaust port 18. The fluid may be any suitable cooling fluid. Water is preferred. It is to be understood that the cooling of article support member 12 is a preferred form of this invention. Should it be desired, the apparatus of this invention would still have many advantages even if article support member 12 was uncooled. Other means of cooling article support member 12 may also be used. For example, refrigerator coils may be placed in contact with the surface, cool air could be blown on face 11**, etc.

Attachment of article support member 12 to heat transfer base 50 is achieved by means of countersunk attaching bolts 22, 22*a*, 20 and 20*a* which fit into threaded recesses 46, 46*a*, 42 and 42*a* respectively, in heat transfer base 50. Recesses 46*a* and 42*a* are not shown. To maintain an air gap between article support member 12 and heat transfer plate 50 there is provided spacers 44, 44*a*, 48 and 48*a*. Spacer 48*a* is not shown. By maintaining this air gap, heat transfer from heat transfer plate 50 to article support member 12 is diminished.

Dies 24 and 24*a* are preferably made of silicon rubber. This rubber is attached to die pedestals 26 and 26*a*. It has also been found that by using the apparatus of this invention that the design portion of the die need only be from about 0.010 to about 0.025 inches high.

Die pedestals 26 and 26*a* are in turn attached to pedestal carrier 30. Attachment between the pedestals and the carrier may be achieved by screwing, welding, or other means conventional in the art. A preferred arrangment is to have die pedestals 26 and 26*a* and pedestal carrier 30 as an integral single piece. This can be accomplished by providing a single piece of metal over which is attached a sheet of silicon rubber carrying the raised designs. Routing of the metal piece is then used to form the die pedestals and remove all excess unneeded surface area.

Raising pedestal carrier 30 is spacer plate 32. Spacer plate 32 may be needed to insure that the uppermost surface of dies 24 and 24*a*, i.e. the upper surface of the design, will protrude above face 11 the desired height. Spacer plate 32 can be mounted by screwing attachment to heat transfer plate 50. In a preferred form, spacer plate 32 is dimensioned so that dies 24 and 24*a* extend above plates 11 a distance of from about 0.001 to about 0.006 inches.

Heat transfer plate 50 is screwed to heater 34 by means of countersunk bolts 17, 17*a*, 19 and 19*a*.

Heater 34 is heated by electrical heating elements which are fed by electrical lines 36, 38 and 40.

All components of the apparatus of this invention may be made of any suitable metal. A preferred metal is aluminum as it has a high heat conductivity and is easily worked and machined. It should also be noted that a different number of dies and corresponding die pedestals will be needed for different type decorations. This invention is not limited to the utilization of two die and two die pedestals. Of course, the number of die openings will correspond to the number of dies used.

Figure 1:
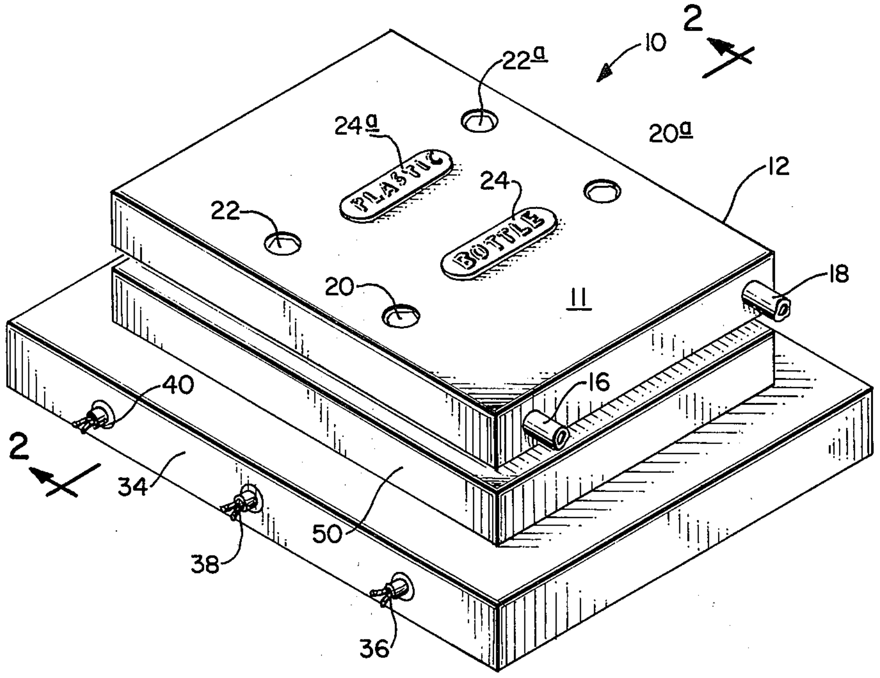
FIG. 1 is a perspective view of an apparatus of this invention attached to a conventional heater plate.
Figure 2:
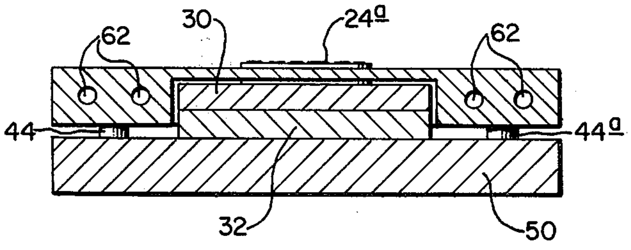
FIG. 2 is a sectional view taken along section lines 2—2 of FIG. 1.
Figure 3:
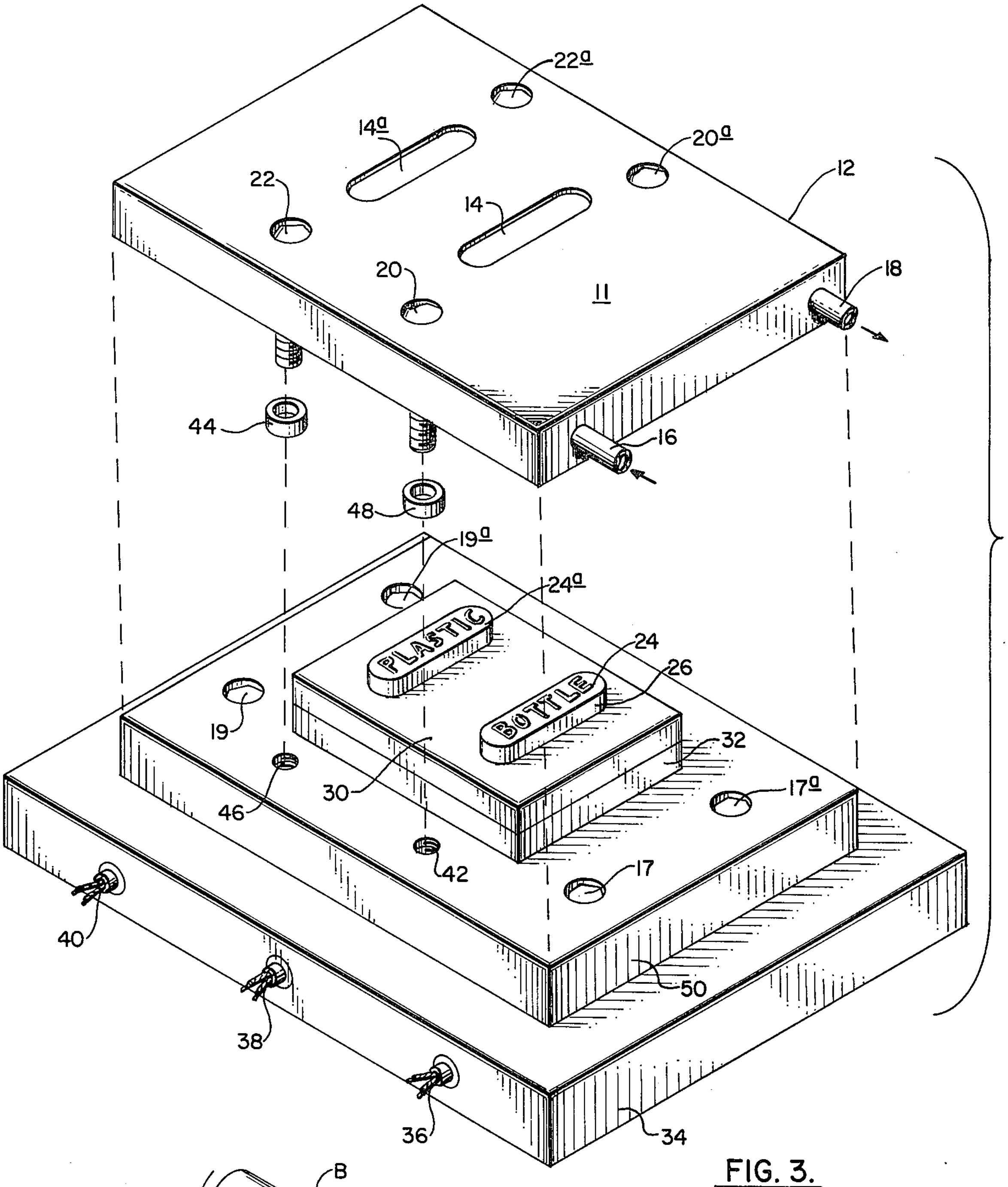
FIG. 3 is an exploded view of the apparatus shown in FIG. 1.
Figure 7:
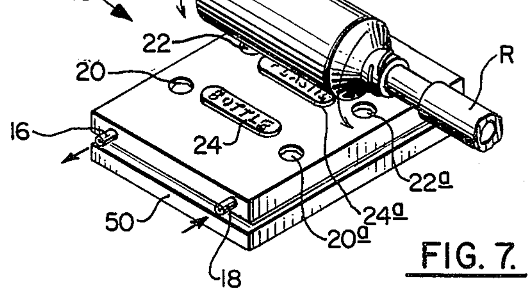
FIG. 7 is a perspective view showing the apparatus of this invention as used in peripheral hot stamping a plastic container.

Referring now to FIG. 7, it is illustrated how the apparatus of this invention is utilized in decorating a hollow, plastic bottle. Bottle B is mounted on rotary arm R which rotates bottle B as a die chase of this invention is moved so that the bottle surface works over the die. Decorating tape T is of course passed between the die and the container.

What is claimed is:

1. A hot stamping die chase and die used for decorating hollow, plastic articles which comprises:

a. a heat transfer base;

b. a die carrying means and a die, said die carrying means carrying said die and being joined to said base; and c. article support means having a face for supporting the surface of said article as it is brought into contact with said die, said article support means having at least one opening therethrough through which said die protrudes above said face.

2. The chase of claim 1 wherein said article support means is kept at a temperature below that of said die by cooling means.

3. The chase of claim 2 wherein said cooling means comprises channels within said article support means through which fluids may circulate.

4. The chase of claim 1 wherein said die carrying means is a pedestal having an uppermost surface upon which said die is attached.

5. The chase of claim 4 wherein said pedestal is carried on a pedestal carrying means, said pedestal carrying means being attached to said base.

6. The chase of claim 5 wherein said article support means has a recess into which said pedestal carrying means fits without making contact with said article carrying means, said recess encompassing said openings.

7. The chase of claim 5 wherein said pedestal and said pedestal carrying means are an integral single piece.

8. The chase of claim 1 wherein said die protrudes above said face a distance of from about 0.001 to about 0.006 inches.

9. The chase of claim 1 wherein said die is formed by a sheet of silicon rubber having a raised design.

10. The chase of claim 1 wherein the raised designs are from about 0.010 to about 0.025 inches high.

* * * * *